United States Patent [19]
Lynk et al.

[11] Patent Number: 5,025,442
[45] Date of Patent: Jun. 18, 1991

[54] TDM/FDM COMMUNICATION SYSTEM WITH PSEUDO-DUPLEX CAPABILITY

[75] Inventors: Charles N. Lynk; Eric R. Schorman, both of Bedford, Tex.

[73] Assignee: Motorola, Inc., Schaumburg, Ill.

[21] Appl. No.: 300,520

[22] Filed: Jan. 23, 1989

[51] Int. Cl.$^5$ .............................. H04L 5/14; H04J 4/00
[52] U.S. Cl. .......................................... 370/29; 370/24; 370/50; 370/70; 370/110.1
[58] Field of Search ....................... 370/29, 24, 50, 70, 370/109, 110.1, 69.1, 120, 75, 76, 30, 97

[56] References Cited

U.S. PATENT DOCUMENTS

| | | | |
|---|---|---|---|
| 4,145,657 | 3/1979 | Hanni | 370/29 |
| 4,546,470 | 10/1985 | Naylor et al. | 370/97 |
| 4,549,303 | 10/1985 | Gutleber | 375/25 |
| 4,599,719 | 7/1986 | Breen et al. | 370/24 |
| 4,675,863 | 6/1987 | Paneth et al. | 370/50 |
| 4,713,809 | 12/1987 | Mizota | 370/97 |
| 4,754,450 | 6/1988 | Lynk et al. | 370/29 |

FOREIGN PATENT DOCUMENTS

| | | | |
|---|---|---|---|
| 0227148 | 7/1987 | European Pat. Off. | 370/24 |
| 0244117 | 11/1987 | European Pat. Off. | 370/224 |
| 2599202 | 11/1987 | France | 370/24 |

*Primary Examiner*—Douglas W. Olms
*Assistant Examiner*—Alpus H. Hsn
*Attorney, Agent, or Firm*—Steven G. Parmelee

[57] ABSTRACT

A communication system that provides pseudo-duplex communications between communication units. A control slot is used to allow a receiving unit to transmit a request to interrupt, and to instruct a transmitting unit to interrupt its transmissions and to begin receiving.

4 Claims, 4 Drawing Sheets

TDM/FDM COMMUNICATION SYSTEM WITH PSEUDO-DUPLEX CAPABILITY

TECHNICAL FIELD

This invention relates generally to radio frequency communication systems.

BACKGROUND ART

Radio frequency (RF) communication systems that make use of frequency division multiplexing (FDM) are known. In such systems, commonly known as trunked communication systems, communication channels are assigned for use from time to time to subscribers as needed. To facilitate the channel assignment mechanism, such systems generally provide either a dedicated control channel that supports the channel assignment signalling, or the control channel function is distributed amongst the voice channels; for example, by providing the control channel information subaudibly simultaneously with voice traffic.

RF systems that make use of time division multiplexing (TDM) are also known. In these systems, a communication frequency (or pair of frequencies) is divided by time into frames and slots, and subscribers are assigned a slot to support their communication needs.

Combined FDM/TDM systems are also known. In such systems, a subscriber will be assigned a particular time slot on a particular frequency (or pair of frequencies) to support its communication needs. These systems provide a control slot on one of the frequencies to support the channel assignment information.

The known FDM, TDM, and FDM/TDM communications systems do not economically support many desired features. For example, full duplex RF capabilities must be provided in an FDM radio to support full duplex communications. While a properly configured TDM or FDM/TDM radio can support full duplex communications without full duplex RF capabilities, channel access time, channel monitoring capabilities and other features in such systems are often degraded.

A need exists for a communication system that will economically support needed and desirable features and options while simultaneously offering high quality communications and operability.

SUMMARY OF THE INVENTION

These needs and others are substantially met through provision of the time division multiplexed, multiple frequency communication system disclosed herein. This system supports a plurality of TDM frames on at least some of its multiple frequencies, wherein each TDM frame includes a plurality of time slots. Some of these time slots are used to substantially support voice and data message communications, and two or more of these time slots are control information slots that are used to substantially support control information, such as channel assignment signalling. Depending upon the application, the control information slots may be on the same communication frequency, or on different frequencies. If on different frequencies, the control slots must still be in different time slots from one another to prevent contention and preferably are not in adjacent time slots.

In one embodiment, frequency and slot assignments for voice and/or data communications are assigned in a way that assures that the assignments for a particular communication unit do not contend with at least one of the control information slots, thereby assuring that all communication units can gain access to at least one of the control slots at all times. Further, the system can be made particularly sensitive to such assignments, such that signalling information intended for a particular communication unit can be transmitted during a control slot that the communication unit is known to be monitoring, and not during the remaining control slots.

In another embodiment, the slot assignment process can be made dynamically responsive to loading and/or the communication needs of a particular communication unit. In particular, the system can monitor one or more predetermined parameters that represent loading for the communication system, and assign a number of time slots to a requesting communication unit or modify the slot duration as commensurate with the monitored parameter. For example, higher voice quality may generally be attained by assigning two time slots for communication, as versus one, thus allowing transmission of greater speech coding information. During times of light communication traffic, two time slots may be assigned to a requesting unit without degrading the grade of service offered to other subscribers. In the alternative, during times of heavy traffic, it may be appropriate to provide a requesting unit with only one slot to support its voice communication traffic, thereby providing acceptable audio quality to the requesting unit while still retaining a capability of servicing other units as well.

BEST MODE FOR CARRYING OUT THE INVENTION

Figure 1:
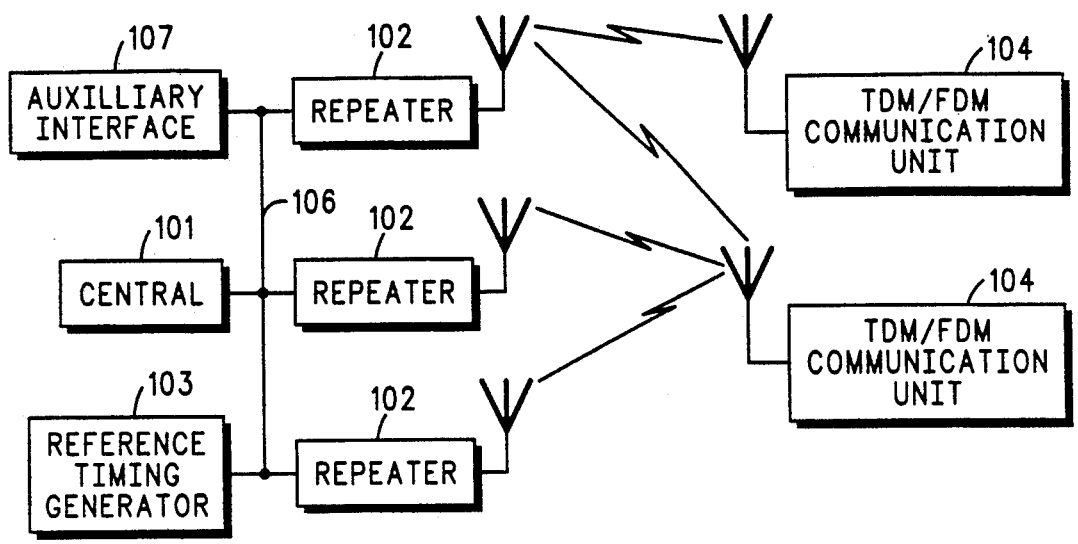
FIG. 1 provides a system block diagram.

Referring to FIG. 1, a system implementing the invention can be seen as generally depicted by the numeral 100. The system (100) includes generally a central controller (101) that controls the allocation of communication channels (frequencies and time slots) to promote organized communication between various communication units. The central controller (101) connects via appropriate interconnections, in a known manner, to a plurality of repeaters (102), there being one repeater (102) for each supported frequency (or frequency pair, depending upon the application). The central controller (101) controls the operation of the repeaters (102) and provides control channel information. Each repeater (102) may include a microprocessor and associated digital circuitry, in which case the controlling actions of the central controller (101) may take the form of data packets transferred over an interconnecting network (106).

The system also includes a reference timing generator (103) and one or more auxiliary interface units (107). The timing generator (103), which may include a high stability reference oscillator, provides various clock signals, including but not limited to the TDM frame clock, slot clock, and data bit clock, to the central controller (101) and the repeaters (102) to maintain time synchronization throughout the system so that symbols, slots and frames on all frequencies coincide in time. The auxiliary interfaces (107) provide means to interconnect the system (100) with non-RF communication units, such as telephone lines and dispatch consoles.

The system also includes a plurality of TDM/FDM capable communication units (104). (As used herein, "communication unit" is intended to refer to any of a variety of radio platforms, including but not limited to mobile radios, portable radios, and fixed location radios, including both one-way and two-way devices.)

Figure 2:
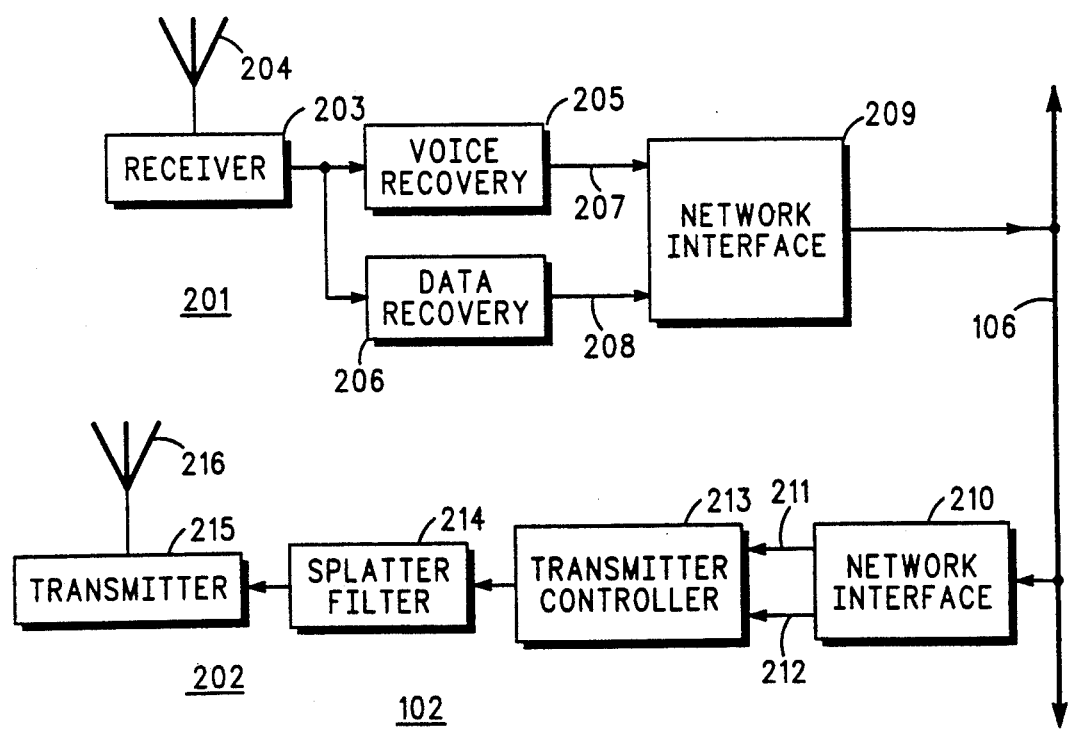
FIG. 2 comprises a block diagram depiction of a repeater.

Referring to FIG. 2, the repeater (102) will now be described. The repeater (102) includes a receive and a transmit section (201 and 202). The receiver section (201) includes an RF receiver (203) that receives signals via an appropriate antenna structure (204) and that provides at its output a baseband signal. The latter signal is passed to both a voice recovery block (205) and a data recovery block (206). The voice recovery block processes the received baseband signal to recover the voice information signal (207). This signal might represent some processed version of the original audio signal. (An example of this audio processing can be found in a commonly owned co-pending application filed Apr. 29, 1988 and having Ser. No. 187,685, incorporated herein by this reference.) Depending on the nature of the repeater interconnection network (106) the voice recovery block (205) may include an audio encoder/decoder to reformat the received voice signal (207). In the case of the aforementioned audio processing, this coding function could be accomplished with a digital signal processor, for example the Motorola DSP56000.

The data recovery block operates in a known manner to recover any data information (such as, for instance, control slot information) included in the received signal, thus providing the received data signal (208). The recovered voice signal (207) and data signal (208) are passed to a repeater network interface (209), which communicates these to the central controller (101) or other repeaters (102) as is appropriate via the repeater interconnection network (106). So configured, the repeater (102) receives TDM RF signals and properly processes them to recover both voice and data information that may be present in the communication.

The transmitter section (202) also includes a network interface (210) that receives voice signals (211) and data signals (212). The voice signals (211) comprise received voice signals (207) from the repeater's receiver section (201) or from the receiver sections (201) of other repeaters (102) in the system. The data signals (212) include control channel information from the central controller (101). The voice signal (211) and data signal (212) are processed by a transmitter controller (213) to provide an appropriately coded and slot and frame synchronized signal at its output. As in the receiver section (201), the transmitter controller (213) may include a DSP to reformat the voice signal (211) as appropriate for various receiving communication units. The output of the transmitter controller (213) is passed through a splatter filter (214) to an RF transmitter (215) that properly processes the signal to provide a signal that may be appropriately radiated from an antenna device (216) to cause transmission of the processed signal as desired.

Figure 3:
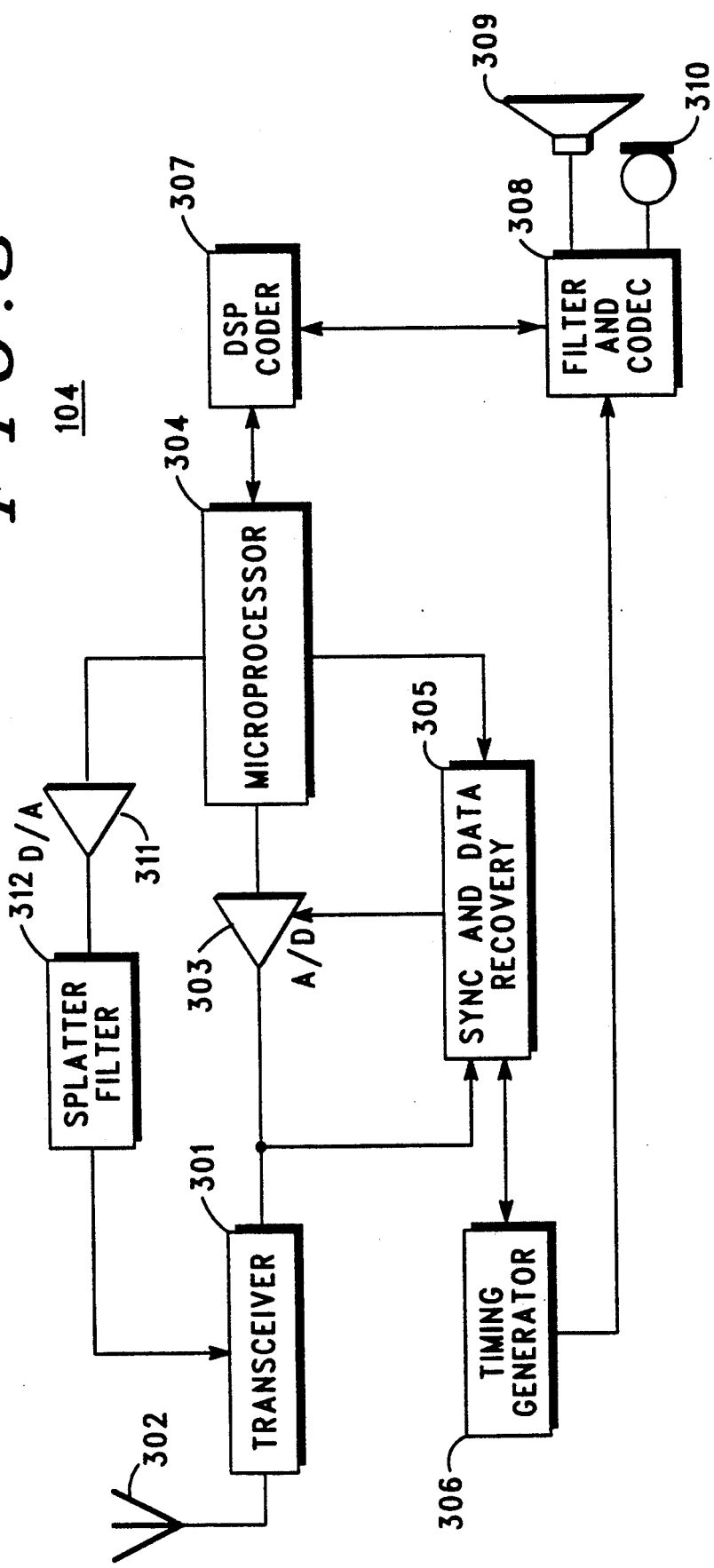
FIG. 3 comprises a block diagram depiction of a subscriber unit.

Referring to FIG. 3, a TDM/FDM capable communication unit (104) will be described. The communication unit (104) includes an RF transceiver (301) that couples to an appropriate antenna (302) to transmit and receive RF signals. The transceiver (301) provides a received baseband signal which is digitized by an analog to digital converter (303). The output of the A/D converter is passed to a microprocessor (304), such as, for example, the Motorola MC68000. The baseband signal is also passed to a sync and data recovery block (305) which processes the signal to establish frame and bit synchronization with the transmitting repeater (102). The communication unit also includes a clock generator (306) which provides timing signals as appropriate to support the TDM nature of the communications.

The microprocessor (304) processes the received signal and passes the audio information to a DSP coder (307), such as, for example, the Motorola DSP56000, which provides a coding/decoding function used in this embodiment to properly encode (or decode) the audio information in a particular form. (Again, additional information regarding this form of encoding and decoding can be found in a commonly owned co-pending application filed Apr. 29, 1988 and having Ser. No. 187,685.) In an alternate embodiment, the DSP (307) could also perform the functions provided by the microprocessor (304) and the sync and data recovery block (305), resulting in a reduction of hardware complexity. The coder/decoder (307) couples through a filter and coder (308) to an appropriate speaker (309) and microphone (310) to allow received audio information to be rendered audible and to allow originating audio information to be processed and transmitted.

Audio information to be transmitted is passed from the DSP (307) to the microprocessor (304) where additional information appropriate to the TDM nature of the communications is added. The resulting signal, properly coded and slot and frame synchronized, is passed in a digitized form to the digital to analog converter (311). The output of the D/A converter (311) is passed through a splatter filter (312) to the RF transceiver (301) which properly processes the signal to provide a signal that may be appropriately radiated from the antenna device (302) to cause transmission of the processed signal as desired.

Figure 4:
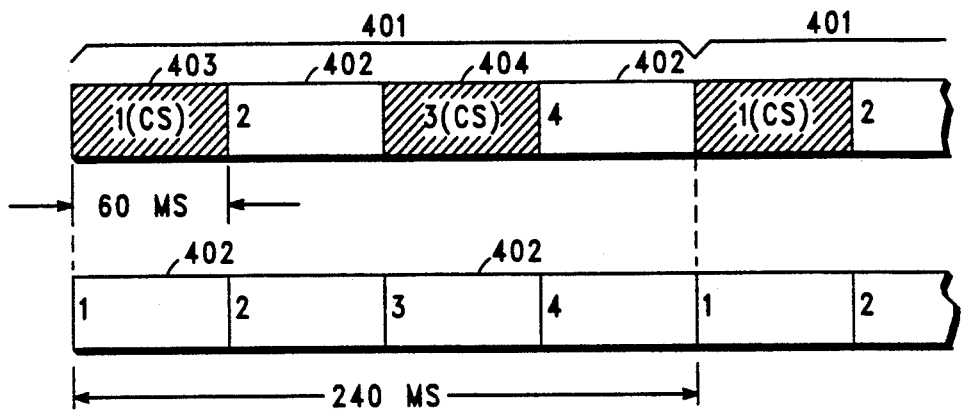
FIG. 4 comprises a timing diagram depicting a two channel/two slot system.

Referring to FIG. 4, the above described system functions in an FDM/TDM operating environment. While certain limited applications could effectively use a single channel, the remaining discussion will describe the more general case wherein at least two frequencies are available for the central (101) to assign for communication purposes, and where each of the frequencies are subdivided into frames and slots. In this particular embodiment, two channels A and B are depicted, each having frames (401) of 240 milliseconds with four slots (402) per frame (each slot being 60 milliseconds). While in the preferred embodiment described, each time slot is of uniform size, non-uniform slot sizes could be used where appropriate. Each frame window supports two control slots (403 and 404). In one embodiment, both control slots (403 and 404) may be on the same frequency. For example, channel A may support a control slot in slot 1 (403) and slot 3 (404) of each of its frames (401). In another embodiment, the control slots are on different frequencies. For example, channel A could support a control slot in slot 1 and channel B could support a control slot in slot 3. In yet another embodiment, the two control slots would be distributed specifically to occur in non-adjacent slots within each TDM frame window. This configuration reduces the maximum time that a communication unit must wait to transmit or receive system control information. For instance, for the four slot system shown in FIG. 4, the maximum time that system control information is unavailable is 60 msec, whereas if the control slots were adjacent, this time would be 120 msec. Regardless of how the control slots are apportioned among the available channels, however, there will always be at least two control slots for each frame window.

Figure 5:
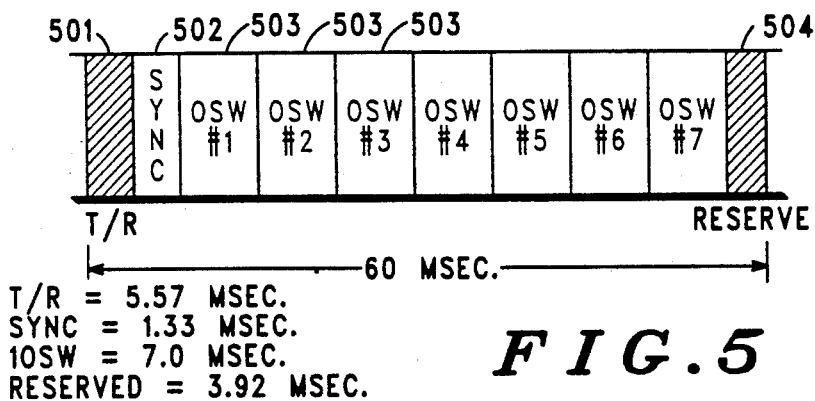
FIG. 5 comprises a timing diagram depicting outbound information in a control slot.

A control slot supports communications control information. FIG. 5 depicts the outbound signalling information (i.e., information sent by the central (101) to the communication units (104) that may be provided in a control slot for this particular embodiment. In the 60 milliseconds provided for the slot, 5.75 milliseconds are used to provide 69 symbols that represent a dotting pattern (501) (which provide a transmit-to-receive transition period) followed by 1.33 milliseconds for 16 symbols that constitute a frame sync word (502) as well understood in the art. Up to 7 outbound signalling words (OSWs) (503) can be provided, with each OSW (503) comprising 84 symbols (7 ms). Finally, 3.92 milliseconds (504) are reserved at the conclusion of the slot.

The 84 symbols comprising each OSW represent 31 data bits that are error encoded up to the 84 symbol limit. The 31 data bits themselves include 16 bits for a communication unit ID, 1 bit for call type, 10 bits for frequency assignment, and 4 bits that represent the assigned slot number. For example, 1 OSW could constitute a talk/request grant to a particular communication unit by identifying that communication unit by its ID, and identifying the assigned frequency and slot.

Figure 6:
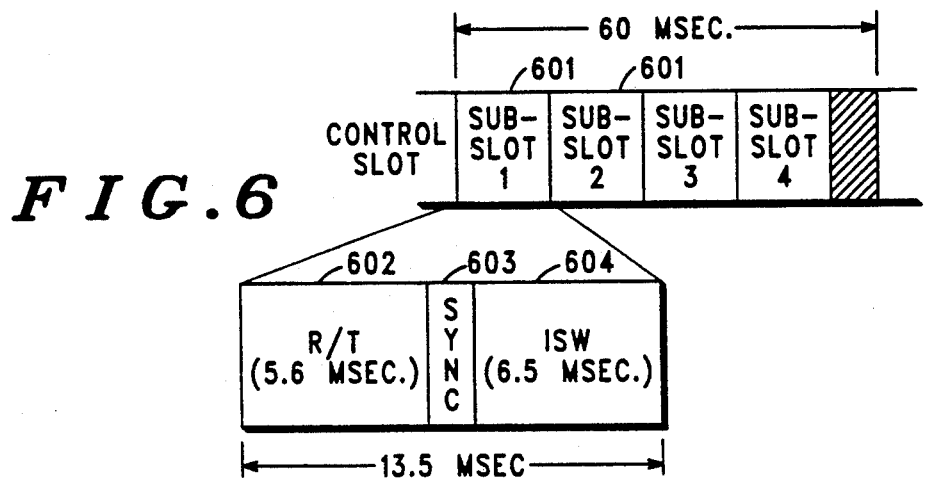
FIG. 6 comprises a timing diagram depicting inbound information on a control slot.

With reference to FIG. 6, inbound signalling words (ISWs) are also provided by the communication units (104 and 105) to the central (101) via the control slots. (If the channel that supports the control slot actually comprises paired frequencies (one for transmitting and one for receiving) as often occurs in trunked communications, then ISWs and OSWs can be supported in a side-by-side manner. If the channel comprises a single frequency only, then ISW and OSW service must be staggered to prevent contention.) For ISWs, the 60 milliseconds of the control slot are subdivided into 4 subslots (601). Each subslot (601) includes a 5.6 millisecond 68 symbol dotting pattern (602) (to allow any transient effects known to occur in the transition from receive-to-transmit to settle) followed by 1.33 milliseconds of 16 symbol frame sync word information (603). 6.5 milliseconds are then allocated to allow 78 symbols of ISW information. These 78 symbols include 21 data bits that are error encoded up to the 78 symbols. The 21 data bits include 16 bits for the communication unit ID and 5 bits to indicate call type request.

So configured, a communication unit (104 or 105) can request frequency and slot assignments via the two slots provided in each frame (401). Further, the central (101) can assign a requesting unit an appropriate frequency and slot assignment, via the two control slots provided in each frame (401). In an alternate embodiment, the control slots, via particular ISWs and OSWs, could also be used to transfer data packets between communications units (104).

Pursuant to one embodiment, when making frequency and slot assignments, the central (101) makes the assignment in a way that will assure that the assigned communication unit (104) will still be able to communicate on at least one of the control slots. For example, with respect to FIG. 4, a requesting unit could be assigned to transmit on slot 1 of channel B and to receive on slot 2 of channel A. This would allow the assigned communication unit (104) to continue to monitor control information in the control slot (404) that occupies the third time slot of channel A. In this way, important system control information, such as emergency preemption messages, can be provided with assurance to all TDM communication units (104), regardless of whether such communication units (104) are currently engaged in communications with other communication units or not.

In another embodiment, the central (101) could direct control information intended for the communication unit (104) previously assigned to slots 1 and 2 to only the control slot (404) known to be monitored by the communication unit (104). In yet another embodiment, communication units (104) may be of differing types with differing constraints as to how quickly a change in mode (receiving or transmitting) or a change in frequency could be accommodated. In a typical communication system, each unit (104) can be identified by a unique ID code. The time limit described above can be associated with the unit ID in a database maintained by the central (101). Accordingly, the central (101) would assign units so as to guarantee sufficient time to switch from participating in the assigned voice communication to monitoring the available control slot. In yet another embodiment, certain communication units (104), such as portable units, can benefit from a reduced duty cycle of receiver operation by reducing the current drain on the battery within the unit. To facilitate this benefit, the central (101) would direct control information intended for some or all of such battery operated units only to a particular system control slot, allowing these units to monitor only one control slot and thus save battery power.

Figure 7:
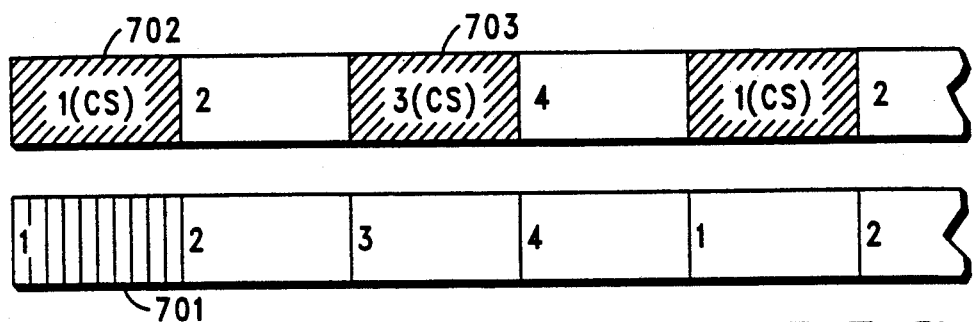
FIG. 7 comprises a timing diagram depicting a single slot simplex communication.

Other important benefits are available through provision of the two control slots as well. For example, with reference to FIG. 7, it may be necessary or appropriate (for instance, due to heavy communication traffic conditions) to assign only a single time slot (701) to 2 or more communication units (104) to support their communication. This would, of course, prevent a full duplex communication from occurring. Nevertheless, in this system, even if the assigned voice time slot (701) contends with one of the control slots (702), at least the remaining control slot (703) can still be monitored by both communication units, regardless of their transmit or receive status. Therefore, if a communication unit that is in a receive mode wishes to interrupt the transmitting communication unit, the receive mode communication unit will transmit an interrupt signal via an ISW on the available control slot (703), which the central (101) then relays via an OSW in a subsequent control slot. This signal will cause the transmit mode communication unit to cease transmitting and to begin receiving in the designated slot (701) regardless of its previous talk mode status. In this way, a receive mode communication unit can effectively interrupt a received message and begin transmitting to the previously transmitting party, and thereby achieve a simulated full duplex communication capability. While this capability is attainable with a single control slot, the provision of two control slots significantly improves system flexibility by allowing assignment of the communication to any slot (402) in the frame (401).

(In the above discussion, the central controller (101) is seen to determine assignment strategies based on observed traffic conditions within the communications system. The traffic conditions could be monitored in several ways, two of which will be described here for illustrative purposes. The amount of time that a communication unit (104) must wait before sufficient resources are available to assign its request is related directly to traffic load. As load increases, the average wait time experienced by communication units increases. Thus the average wait time over some appropriate time interval becomes a measure of traffic load. It is also known that traffic on many communication systems vary regularly on a daily basis. Communication systems can thus be monitored and a daily pattern of traffic load may result. Based on this observed pattern, the traffic load can be predicted based on time of day, and assignment strategies modified appropriately.)

Figure 8:
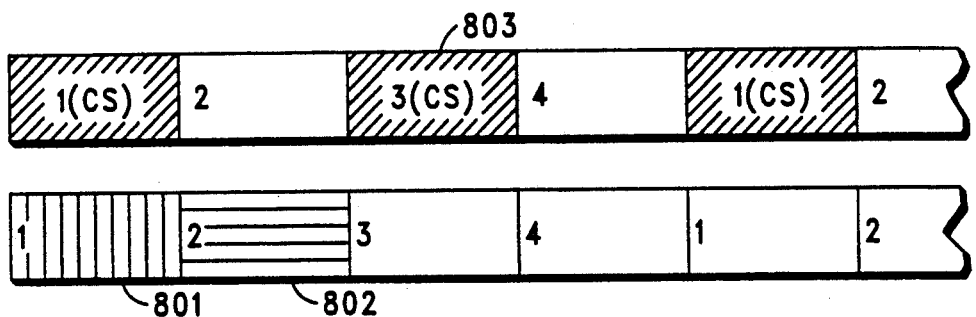
FIG. 8 comprises a timing diagram depicting a full duplex communication.

Of course, with reference to FIG. 8, if traffic conditions or other exigencies permit, 2 time slots (801 and 802) can be made available to 2 or more communication units to support their transmit and receive needs, thereby allowing full duplex communications in a half duplex RF unit (i.e., a radio that can only transmit or receive at a single moment in time). Again, as noted above, the two time slots (801 and 802) assigned to support voice activities will be assigned by the central (101) in a way designed to ensure that at least one of the control slots (in this case, the control slot occupying slot 3 of channel A (803)) will remain uncontended by the voice channel assignment.

Figure 9:
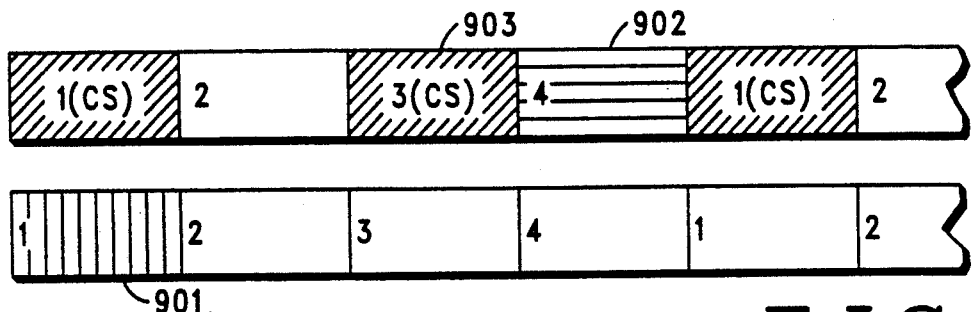
FIG. 9 comprises a timing diagram depicting an alternate full duplex communication.

With reference to FIG. 9, an alternative way of supporting such a full duplex communication would be to assign 1 time slot for voice activity (901) on channel B and a second time slot (902) to support voice activity on channel A. Again these assignments ensure that at least one of the control slots (in this case, slot 3 of channel A (903)) remains available to all of the communication units engaged in that particular assignment. Those skilled in the art will appreciate that multiple slot assignments can be used to facilitate other desirable features, such as, but not limited to, improved audio quality communications by permitting the use of speech coding algorithms requiring a higher information rate.

In another embodiment, the duration of the time slots would be altered in response to traffic conditions. For example, a standard four-slot system might increase slot duration by one-third to 80 milliseconds during light traffic periods. The resulting three-slot system would provide improved audio quality communications. When heavy traffic conditions occur, the slot duration could be reduced to restore full system capacity.

Figure 10:
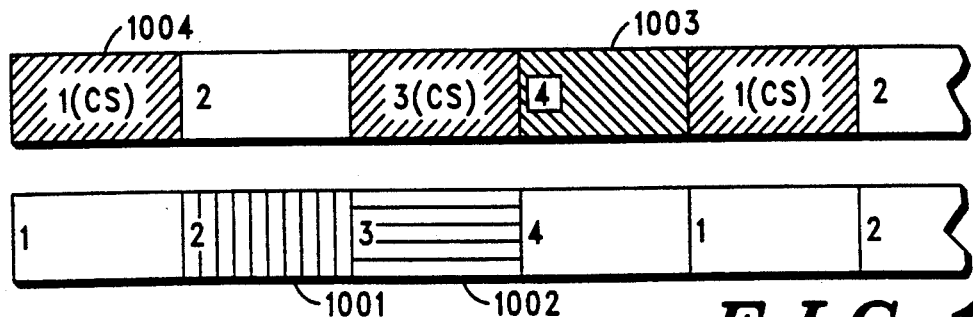
FIG. 10 comprises a timing diagram depicting a full duplex communication being conducted simultaneously with reception of yet another signal.

With respect to FIG. 10, two of the time slots (1001 and 1002) could be assigned to support a full duplex voice communication as described above, and one or more other communication units (104) could be assigned to receive in both time slots (1001 and 1002), thereby achieving a form of conference communications where two units conduct a full duplex communication, while one or more other units monitor both sides of the communication. Further, a third slot (1003) could be assigned to one of the communication units to allow substantially simultaneous reception (or transmission) of a data message that may be displayed on an appropriate display mechanism in the radio. Alternatively, the third slot (1003) could be assigned to one of the communication units to allow substantially simultaneous reception of another voice message that could be stored in memory for future playback. Again, even while supporting these multiple features, at least one control slot (1004) remains available to all of the communications units.

We claim:

1. In a time division multiplexed communication system wherein at least one time slot per TDM frame on at least one communication channel is a system control time slot that is used to substantially support communication control information, a method of providing pseudo-duplex communication between at least a first and second communication unit, comprising the steps of:

(A) transmitting information from said first communication unit in a first time slot wherein the first time slot is assigned to said first communication unit via said system control time slot;

(B) receiving said information by said second communication unit in said first time slot, wherein the reception is terminated by each one of the following conditions:

(i) said first communication unit concludes transmitting, thereby allowing said second communication unit to begin transmitting;

(ii) said first communication unit concludes transmitting, thereby concluding said communication;

(iii) while said first communication unit is transmitting, said second communication unit transmits a talk request signal via said system control time slot, thereby causing said first communication unit to receive a transmit-abort instruction via said system control time slot, thereby allowing said second communication unit to transmit a message to said first communication unit, and said first communication unit to receive said message.

2. In a time division multiplexed communication system wherein at least one time slot per TDM frame on at least one communication channel is a system control time slot that is used to substantially support communication control information, a method of providing pseudo-duplex communication between at least a first and second communication unit, comprising the steps of:

(A) transmitting information from said communication unit in a first time slot wherein the first time slot is assigned to said first communication unit via said system control time slot;

(B) receiving said information by said second communication unit in said first time slot;

(C) while said first communication unit is transmitting, transmitting from said second communication unit a talk request signal via said system control time slot, thereby causing said first communication unit to receive a transmit-abort instruction via said system control time slot, thereby allowing said second communication unit to transmit a message to said first communication unit, and said first communication unit to receive said message.

3. In a first communication unit for use in a time division multiplex communication system wherein at least one time slot per TDM frame on at least one communication channel is a system control time slot that is used to substantially support communication control information, a method of interrupting a transmission from the first communication unit to allow reception of a transmission from a second communication unit, comprising the steps of:
- (A) transmitting information in an assigned time slot, which time slot is assigned via the system control time slot;
- (B) receiving a transmit-abort instruction initiated by the second communication unit via the system control time slot;
- (C) in response to receiving the transmit abort intruction:
  - (i) terminating further transmissions in the assigned time slot; and
  - (ii) receiving a message initiated by the second communication unit in the assigned time slot.

4. In a first communication unit for use in a time division multiplex communication system wherein at least one time slot per TDM frame on at least one communication channel is a system control time slot that is used to substantially support communication control information, a method of interrupting a transmission from a second communication unit to allow transmission by the first communication unit, comprising the steps of:
- (A) receiving a transmission from the second communication unit in an assigned time slot, where the assigned time slot is assigned via the system control time slot;
- (B) transmitting, via the system control time slot, a talk request signal;
- (C) transmitting, via the assigned time slot, a message to the second communication unit.

* * * * *